US012656559B2

(12) United States Patent
Kurata et al.

(10) Patent No.: US 12,656,559 B2
(45) Date of Patent: Jun. 16, 2026

(54) INTEGRATED OPTICAL DEVICE AND MANUFACTURING METHOD THEREOF

(71) Applicant: NTT, Inc., Tokyo (JP)

(72) Inventors: Yu Kurata, Musashino (JP); Yoshihiro Ogiso, Musashino (JP)

(73) Assignee: NTT, Inc., Tokyo (JP)

( * ) Notice: Subject to any disclaimer, the term of this patent is extended or adjusted under 35 U.S.C. 154(b) by 270 days.

(21) Appl. No.: 18/557,870

(22) PCT Filed: Jun. 3, 2021

(86) PCT No.: PCT/JP2021/021207

§ 371 (c)(1),
(2) Date: Oct. 27, 2023

(87) PCT Pub. No.: WO2022/254657

PCT Pub. Date: Dec. 8, 2022

(65) Prior Publication Data

US 2024/0219639 A1 Jul. 4, 2024

(51) Int. Cl.
*G02B 6/42* (2006.01)
*G02B 6/26* (2006.01)

(52) U.S. Cl.
CPC ............. *G02B 6/4239* (2013.01); *G02B 6/26* (2013.01)

(58) Field of Classification Search
None
See application file for complete search history.

(56) References Cited

U.S. PATENT DOCUMENTS

| | | | | |
|---|---|---|---|---|
| 4,744,619 A | * | 5/1988 | Cameron | G02B 6/4212 385/52 |
| 5,513,290 A | * | 4/1996 | Ishikawa | G02B 6/4212 385/98 |
| 2011/0110622 A1 | * | 5/2011 | Akutsu | G02B 6/4225 385/14 |
| 2013/0336652 A1 | | 12/2013 | Ogawa et al. | |

FOREIGN PATENT DOCUMENTS

| | | |
|---|---|---|
| JP | H07-261055 A | 10/1995 |
| JP | H11-64668 A | 3/1999 |
| JP | 2005-070365 A | 3/2005 |
| JP | 2008-250041 A | 10/2008 |
| JP | 2009-093093 A | 4/2009 |
| JP | 2014-002282 A | 1/2014 |
| JP | 2016-024439 A | 2/2016 |
| JP | 2017-223722 A | 12/2017 |

* cited by examiner

*Primary Examiner* — Jerry Rahll
(74) *Attorney, Agent, or Firm* — Workman Nydegger

(57) ABSTRACT

An integrated optical device capable of easily connecting waveguides and achieving stable optical coupling is provided. In the integrated optical device in which an optical circuit that is provided on a substrate that does not transmit light from an ultraviolet range to a visible range and performs optical signal processing and an optical function element made of a material that does not transmit light in the ranges are butt-connected, in the optical circuit, a butt coupling holding substrate that transmits light in the ranges is mounted in a groove that reaches a connection end face where an input/output waveguide is formed, the connection end face of the optical circuit and an end face of the butt coupling holding substrate are processed to be flush with each other, and the optical circuit and the optical function element are fixed by a UV curing adhesive filling the connection end face.

6 Claims, 5 Drawing Sheets

(a)

(b)

(c)

(a)

(b)

(a)

(b)

(a)

(b)

(c)

INTEGRATED OPTICAL DEVICE AND MANUFACTURING METHOD THEREOF

TECHNICAL FIELD

The present invention relates to an integrated optical device and a manufacturing method thereof, and more particularly to an integrated optical device that can be applied to an optical communication system and in which an optical circuit element including an optical waveguide and an optical function element such as a photodiode and an optical modulator are mounted, and a manufacturing method thereof.

BACKGROUND ART

In recent years, with the spread of optical fiber transmission, a technique for integrating a large number of optical circuits at high density is required, and a silica-based planar lightwave circuit (PLC), an optical circuit by silicon photonics (SiP), and the like, are known. The PLC is a waveguide type optical device having excellent characteristics such as low loss, high reliability, and a high degree of freedom in design. A PLC in which optical circuits such as a multiplexer/demultiplexer and a branching/coupling device are integrated is mounted on a transmission apparatus at a transmission end of an optical communication system. The SiP is an optical device that has a high degree of freedom in design and can achieve a smaller optical circuit with a small waveguide bending radius although the SiP cannot achieve as low loss as PLC. In addition, as an optical device other than the PLC and the SiP, a light receiving/ emitting element such as a photodiode (PD) and a laser diode (LD) that converts light and electric signals, and an optical function element such as an optical modulator are also mounted in the transmission apparatus.

In order to further increase communication capacity, there is a demand for a highly functional optoelectronic integrated device in which an optical waveguide such as a PLC that performs optical signal processing and an optical device such as a PD that is made of an InP-based material and performs high-speed photoelectric conversion are integrated. As a platform of such an integrated optical device, the PLC and the SiP are promising, and an optoelectronic integrated device in which a chip of a light emitting and receiving element, a PLC chip, and a SiP chip are integrated in a hybrid has been proposed.

For example, in the example described in Patent Literature 1, a 45-degree mirror is provided in a partial region of a waveguide, a PD chip is mounted on the waveguide, an optical path of light propagating through the optical waveguide is vertically converted by the mirror, and optical coupling with the PD is performed. As in this example, a form of the optical device in which the PLC and the optical function element such as the PD are mounted in combination has advantages in terms of downsizing of the device and a degree of freedom in design of the optical circuit.

In order to increase communication capacity, an integrated optical device has been developed in which multi-channels are formed by optically coupling and mounting a PLC in which optical circuits having functions of multiplexing and demultiplexing optical signals are integrated and a plurality of arrayed optical function elements. In recent years, there has been a demand for integration of a PD having a waveguide structure suitable for achieving a broadband using an InP-based material and an optical function element including a waveguide structure such as an optical phase modulator having a high-speed phase modulation function in order to achieve higher speed and higher functionality. In order to integrate the optical function elements, for example, it is necessary to butt and couple input/output waveguides of the PLC, SiP, and the optical function element made of the Si or InP-based material to fix the waveguides to each other.

In general, a UV curing adhesive is used for connection between PLC and SiP substrates and connection between the PLC and the SiP and an optical function element. For example, in a case where the optical fiber and the waveguide of the PLC are butt-connected, after alignment, an end face of a fiber block made of glass to which the optical fiber is fixed and an end face of the PLC are filled with a UV curing adhesive and are cured by irradiation with ultraviolet light (UV light). The UV curing adhesive can be cured in a short period of time, and thus, the UV curing adhesive can be bonded more easily than a thermosetting adhesive. If an optical integrated circuit in which a PLC on which an optical circuit is integrated and an optical function element are integrated or an optical integrated circuit in which a SiP on which an optical circuit is integrated and an optical function element are integrated can be achieved using such a butt connection, a more functional optical device can be provided.

FIG. 1 illustrates butt connection between a SiP chip and an InP chip in related art. FIG. 1(a) is a top view, and FIG. 1(b) is a cross-sectional view along a waveguide to be connected. In a SiP chip 10, an optical waveguide in which a lower cladding layer 12, a waveguide core 13, and an upper cladding layer 14 are laminated is formed on a Si substrate 11. An InP chip 20 is an optical function element in which a waveguide core 22 is formed on an InP substrate 21. As illustrated in FIG. 1(a), the waveguides are aligned, a portion between end faces of both chips is filled with a UV curing adhesive 31, and UV light is radiated.

However, in the optical circuit formed in the SiP chip 10, the cladding layer constituting the waveguide is made of $SiO_2$ that is transparent from an ultraviolet range to a near-infrared range, but the substrate is often made of Si that absorbs light from the ultraviolet range to a visible range. In addition, the substrate of the optical function element made of InP is also made of a material that is not transparent from the ultraviolet range to the visible range, such as Si and InP. Thus, even if UV light is radiated, the UV light does not pass through the substrates of both the chips (10, 20), and thus, as illustrated in FIG. 1(b), the UV light does not reach most of a bonding region A. There is therefore a problem that the UV curing adhesive 31 cannot be completely cured, and sufficient adhesive strength cannot be obtained.

FIG. 2 illustrates a connection method using a butt coupling holding substrate in related art. FIG. 2(a) is a top view, and FIG. 2(b) is a cross-sectional view along a waveguide to be connected. Under the InP substrate 21 of the InP chip 20, a butt coupling holding substrate 32 made of a glass substrate that transmits UV light is mounted. When both chips are bonded, the butt coupling holding substrate 32 is also butted at the same time, filled with the UV curing adhesive 31, and irradiated with UV light. The UV light is transmitted through the butt coupling holding substrate 32, and thus, both the chips (10, 20) and the butt coupling holding substrate 32 can be firmly bonded and fixed.

However, it is difficult to completely align the bonding surfaces of the InP chip 20 and the butt coupling holding substrate 32 with respect to the SiP chip 10. In addition, the InP is a material that is easily broken by an external force, and thus, it is also difficult to align bonding surfaces by polishing or dicing after the InP chip 20 is mounted on the butt coupling holding substrate 32. In a case where the bonding surfaces are not aligned, for example, if the bonding surface of the butt coupling holding substrate 32 protrudes from the bonding surface of the InP chip 20, an interval between the both chips (10, 20) is separated, a gap between the waveguides to be connected increases, and a loss increases due to radiation of propagation light. As described above, in a case where the bonding surfaces cannot be aligned, there is a problem that deviation of the bonding surface varies every time the optical device is manufactured, and a connection loss varies.

In addition, although the bonding surface of the butt coupling holding substrate 32 can be fixed, the InP chip 20 itself does not transmit UV light, and thus, an uncured UV curing adhesive 31 still remains on the bonding surface of the InP chip 20. This method is therefore not suitable for butt coupling from the viewpoint of long-term reliability. As described above, in an optical integrated circuit in which a PLC or SiP in which optical circuits are integrated and an optical function element are hybrid integrated, there is a problem in implementation of an integrated optical device in which optical waveguides are stably butted and fixed.

CITATION LIST

Patent Literature

Patent Literature 1: JP 2005-70365 A

SUMMARY OF INVENTION

An object of the present invention is to provide an integrated optical device that is an optical integrated circuit in which an optical circuit having a waveguide structure and an optical function element such as a light receiving/emitting element and an optical modulator are mounted, can be easily connected when the waveguides are butt-connected, and implements stable optical coupling, and a method for manufacturing the integrated optical device.

In order to achieve such an object, an embodiment of the present invention is an integrated optical device in which an optical circuit that is provided on a substrate that does not transmit light from an ultraviolet range to a visible range and performs optical signal processing and an optical function element made of a material that does not transmit light from the ultraviolet range to the visible range are butt-connected, in the optical circuit, a butt coupling holding substrate that transmits light from the ultraviolet range to the visible range is mounted in a groove that reaches a connection end face on which an input/output waveguide is formed, and the connection end face of the optical circuit and an end face of the butt coupling holding substrate are processed to be flush with each other, and the optical circuit and the optical function element are fixed by a UV curing adhesive filling the connection end face being cured by UV light transmitted through the butt coupling holding substrate.

DESCRIPTION OF EMBODIMENTS

A detailed description of embodiments of the present invention will be described below with reference to the drawings.

Figure 3:
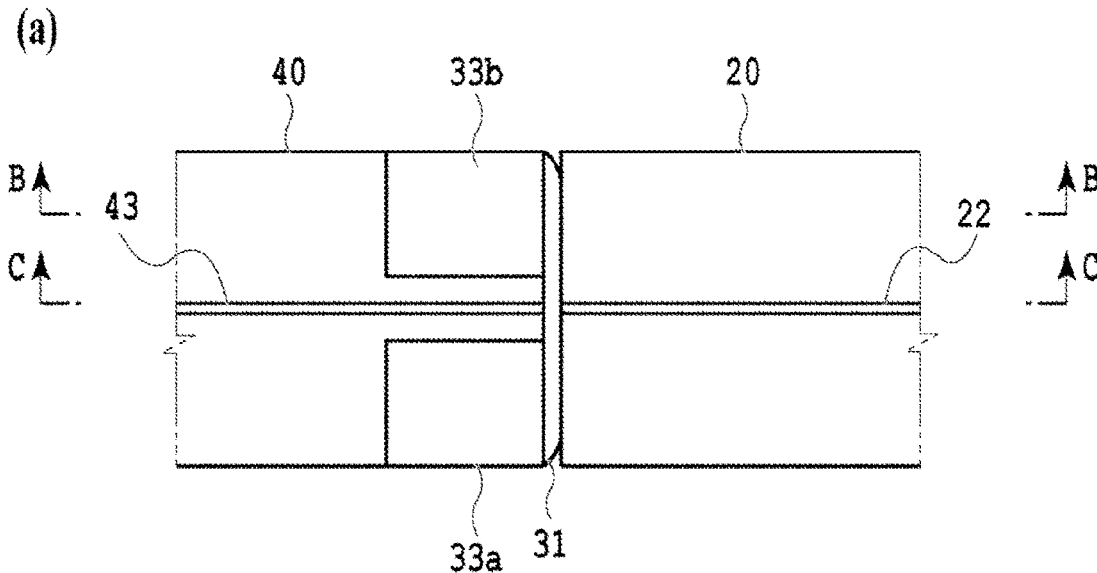
FIG. 3 is a view illustrating butt connection between an SiP chip and an InP chip according to an embodiment of the present invention.
Figure 3:
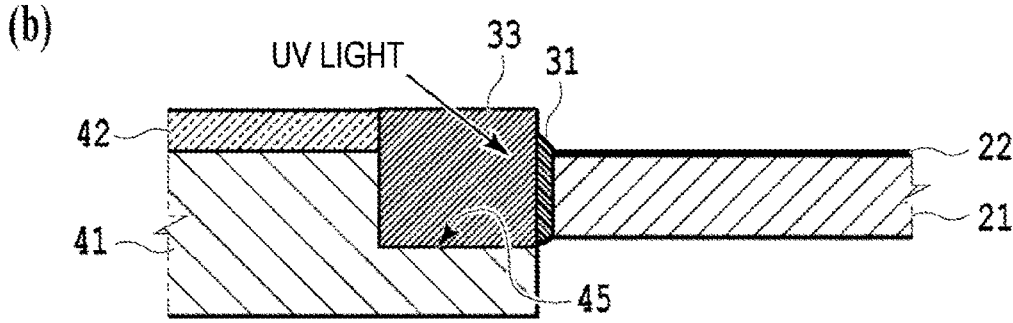
Figure 3:
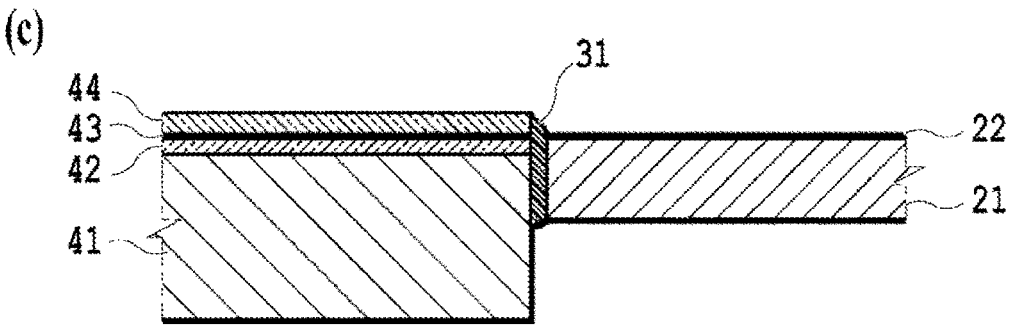

FIG. 3 illustrates butt connection between a SiP chip and an InP chip according to an embodiment of the present invention. FIG. 3(a) is a top view, FIG. 3(b) is a cross-sectional view taken along a line B-B' of FIG. 3(a), and FIG. 3(c) is a cross-sectional view taken along a line C-C' of FIG. 3(a). In the SiP chip 40, an optical waveguide in which a lower cladding layer 42, a waveguide core 43, and an upper cladding layer 44 are laminated is formed on a Si substrate 41. In the SiP chip 40, a groove 45 reaching a connection end face of a substrate serving as a bonding surface is formed, and butt coupling holding substrates 33a and 33b made of glass substrates are fixed. An InP chip 20 is an optical function element in which a waveguide core 22 is formed on an InP substrate 21. As illustrated in FIG. 3(a), the wave-guides of both chips (20, 40) are aligned at the butt coupling portion which becomes the bonding surface, a portion between the end faces of both chips is filled with a UV curing adhesive 31, and ultraviolet light (UV light) is radiated to cure the chips.

As illustrated in FIG. 3(a), the groove 45 of the SiP chip 40 is formed to reach the connection end face of the substrate serving as the bonding surface except for a region where the waveguide core 43 serving as the input/output waveguide is formed. As illustrated in FIG. 3(b), the groove 45 is formed not only over the upper cladding layer 44, the waveguide core 43, and the lower cladding layer 42 forming the waveguide but also over part of the Si substrate 41. The butt coupling holding substrate 33 is fixed to the groove 45, and the connection end face of the SiP chip 40 serving as the bonding surface and the end face of the butt coupling holding substrate 33 are aligned to be flush by polishing or dicing.

As illustrated in FIG. 3(a), the waveguides are aligned at the butt coupling portions of both the chips (40, 20), a portion between the end faces of both the chips is filled with the UV curing adhesive 31, and UV light is radiated. Most of the UV curing adhesive 31 filling the portion between the end faces is cured by the UV light transmitted through the butt coupling holding substrates 33a and 33b. Thus, without providing a fixing glass substrate on the side of the InP chip 20, it is possible to achieve butt connection capable of performing adhesion using the UV curing adhesive 31 and obtaining sufficient adhesive strength. The bonding surface of the SiP chip 40 can be stably connected because the Si substrate 41 and the butt coupling holding substrate 33 are aligned by polishing or dicing.

According to the present embodiment, it is possible to provide an integrated optical device capable of easily connecting both chips and achieving stable optical coupling from the viewpoint of long-term reliability.

Generally, in the cross-sectional structure of the PLC, a $SiO_2$ thin film having a thickness of about 20 μm as a lower cladding layer, 3 to 10 μm as a waveguide core, and about 20 μm as an upper cladding layer is deposited on a Si or SiO$_2$ substrate. In addition, in the cross-sectional structure of the SiP, SiO$_2$ forming an SOI layer as a lower cladding layer is deposited on a Si substrate by several μm, Si as a waveguide core is deposited by several hundred nm, and SiO$_2$ as an upper cladding layer is deposited by several μm. Further, in the optical function element using the InP as a substrate, the InP substrate is used as a lower cladding layer, a compound semiconductor is deposited as a waveguide core with a thickness of several hundred nanometers, the InP is deposited as an upper cladding layer, and SiN or SiO$_2$ is deposited as passivation.

Waveguides reaching end faces of the respective substrates are used as input/output waveguides for inputting and outputting optical signals and are optically coupled with a mode field at the end faces. In the region where the input/output waveguide is formed, a groove that reaches the connection end face is formed on both sides of the waveguide core at an interval that does not affect the mode field.

A butt coupling holding substrate made of a transparent material from the ultraviolet range to the visible range is mounted in the groove. As the butt coupling holding substrate, for example, quartz glass is desirably used.

A length of the groove and the butt coupling holding substrate parallel to the waveguide core, a depth of the groove, and a thickness of the butt coupling holding substrate allow UV light radiated from the top surface of the chip to irradiate the UV curing adhesive filling the portion between the end faces of the substrate. In the above-described embodiment, it is desirable that the depth of the groove and the thickness of the butt coupling holding substrate 33 be equal to or larger than a thickness of the InP chip 20 in order to increase strength of adhesion and fixation with the InP chip 20 which is an optical function element.

The groove is formed and the butt coupling holding substrate is mounted not for each chip cut out from the wafer, but are efficiently formed and mounted in a state of a wafer or in a strip state in which a plurality of chips is cut out in a line. As one step of the wafer processing process, if the groove can be formed and the butt coupling holding substrate can be mounted, the connection end face of the optical circuit and the connection end face of the butt coupling holding substrate can be made flush with each other by chipping by dicing, or the like. In addition, a bonding surface having high flatness can be formed by polishing the end face.

Furthermore, a light shielding film that transmits or absorbs near-infrared light may be formed on a surface facing the bonding surface of the butt coupling holding substrate 33, that is, an end face on the side of the optical circuit integrated on the SiP chip 40. For example, a metal film does not transmit near-infrared light, and thus, stray light generated in the optical circuit of the SiP chip 40 can be prevented from leaking out to the optical function element side of the InP chip 20. As a result, for example, in a case where the PD is integrated in the optical function element, stray light as noise of signal light can be prevented from reaching the PD, and characteristics of the optical function element can be improved.

As described above, in an integrated optical device in which an optical circuit that is provided on a substrate that does not transmit light from the ultraviolet range to the visible range and performs optical signal processing and an optical function element made of a material that does not transmit light from the ultraviolet range to the visible range are hybrid integrated, a butt coupling holding substrate that transmits light from the ultraviolet range to the visible range is mounted in a groove that reaches a connection end face of the optical circuit in which an input/output waveguide is formed. The end face of the butt coupling holding substrate and the connection end face of the optical circuit are processed to be flush with each other, and the UV curing adhesive filling the portion between the end faces is cured by the UV light transmitted through the butt coupling holding substrate. Most of the UV curing adhesive can be cured, and thus, there is no variation in connection loss due to deviation of the connection end face, and the input/output waveguide of the optical circuit and the input/output waveguide of the optical function element can be accurately coupled. In addition, sufficient adhesive strength can be obtained, so that it is possible to provide an integrated optical device capable of achieving stable optical coupling from the viewpoint of long-term reliability.

Example 1

An example of the integrated optical device of the present embodiment will be described. The optical function element is an optical modulation element including a waveguide constituting a phase modulator that changes a phase of light by inputting an electrical signal and an input/output waveguide connected to the phase modulator. The SiP chip includes an optical circuit that processes a plurality of types of signal light and an input/output waveguide connected to the optical circuit and has a butt coupling holding substrate mounted thereon. The signal light output from the output optical waveguide of the optical circuit is coupled to the input optical waveguide of the optical function element via the butt coupling portion and is input to the optical modulation element. The phase-modulated signal light is input from the output optical waveguide of the optical function element to the optical circuit again via the butt coupling portion. As described above, the integrated optical device is an optical integrated circuit in which the SiP chip and the optical function element transmit and receive signal light via the butt coupling portion.

Figure 4:
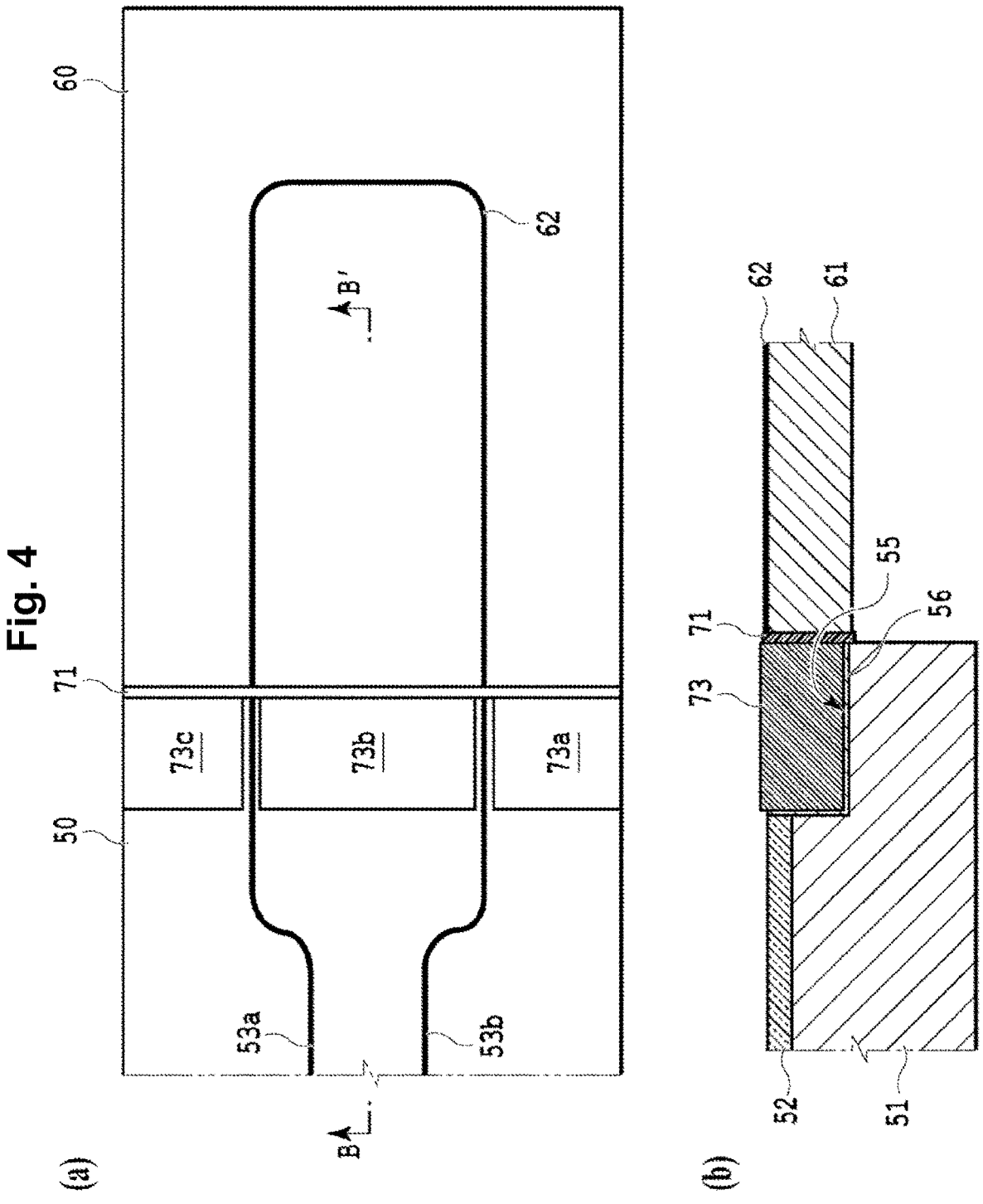
FIG. 4 is a view illustrating butt connection between an SiP chip and an InP chip according to Example 1.

FIG. 4 illustrates butt connection between the SiP chip and the InP chip according to Example 1. FIG. 4(*a*) is a top view, and FIG. 4(*b*) is a cross-sectional view taken along a line B-B' of FIG. 4(*a*). A size of the SiP chip 50 is 2.5 mm in length and 2.0 mm in width. A lower cladding layer 52 that has a film thickness of 3.0 μm and is SiO$_2$, a Si waveguide core 53 having a film thickness of 0.22 μm and a width of 0.5 μm, and an upper cladding layer 54 that has a film thickness of 1.5 μm and is SiO$_2$ are sequentially laminated on a Si substrate 51 having a plate thickness of 0.625 mm. The optical waveguide is formed. As illustrated in FIG. 4(*a*), as input/output waveguides of an optical circuit formed in the SiP chip 50, waveguide cores 53*a* and 53*b* having an S-shaped waveguide structure are formed up to the end face of the SiP chip 50.

In the SiP chip 50, a groove 55 reaching a connection end face of a substrate serving as a bonding surface is formed, and butt coupling holding substrates 73*a* to 73*c* made of a glass substrate are fixed. As illustrated in FIG. 4(*b*), three grooves 55 are provided at a depth of 0.27 mm in a vertical direction of the substrate. The length of the groove 55 parallel to the waveguide core 53 is a size of 0.5 mm, and the length parallel to the end face is 1.0 mm between the input/output waveguides and 0.7 mm outside the input/output waveguides. The width of each of the regions where the waveguide core 53 serving as the input/output waveguide is formed and the groove 55 is not formed is 0.05 mm.

The butt coupling holding substrates 73a to 73c are smaller than the groove 55 by 0.02 mm in both length and width and are made of synthetic quartz having a plate thickness of 0.3 mm. The butt coupling holding substrate 73 is mounted in the groove 55 and fixed with an adhesive 56. An end face of the butt coupling holding substrate 73 and the connection end face of the SiP chip 50 are polished so as to be flush with each other. By making the plate thickness of the butt coupling holding substrate 73 larger than the plate thickness of the InP chip 60, the entire end face of the InP chip 60 can be adhered, leading to improvement of adhesive strength.

The size of the InP chip 60 is 2.5 mm in length, 4.0 mm in width, and 0.25 mm in substrate thickness. Using the InP substrate 61 as a lower cladding layer, a waveguide core 62 made of a compound semiconductor having a film thickness of 0.3 $\mu$m and a width of 2.0 $\mu$m, and an upper cladding layer of InP having a film thickness of 2.0 $\mu$m are deposited. Note that the optical function element of Example 1 has a structure including only a U-shaped folded waveguide that directly inputs signal light output from the SiP chip 50 to the SiP chip 50 as a connection test device.

A butt coupling method of the InP chip 60 to the SiP chip 50 will be described. First, a connection end face serving as a butt coupling portion between the SiP chip 50 and the InP chip 60 is observed from the upper surface, and each input/output waveguide is pre-aligned. Next, the output of the optical circuit is monitored by inputting the signal light for alignment to the optical circuit of the SiP chip 50 and inputting the signal light output from one of the Si waveguide cores 53 to the folding waveguide (waveguide core 62) of the InP chip 60 to the optical circuit again from the other Si waveguide core 53. Positions of the input/output waveguides of the SiP chip 50 and the InP chip 60 are precisely aligned so that light intensity of the monitored light is maximized.

A UV curing adhesive 71 that is transparent in the infrared range fills a portion between the end faces of the SiP chip 50 and the InP chip 60. Next, the UV curing adhesive 71 is cured by irradiating the butt coupling portion with UV light via the butt coupling holding substrate 73. By using the butt coupling holding substrate 73 that is transparent from the ultraviolet range to the visible range, it is possible to irradiate almost the entire surface of the connection end face of the butt coupling portion with UV light, so that it is possible to sufficiently cure the UV curing adhesive 71.

Note that the surface of the butt coupling holding substrate 73 is desirably a polished surface so that a state of the connection end face of the butt coupling portion, such as a state of being filled with the UV curing adhesive 71, can be directly checked with a camera, or the like. In addition, an antireflection film corresponding to a refractive index of the UV curing adhesive 71 which is to fill the region may be formed on the end face of the butt coupling portion where the waveguide core 62 of the InP chip 60 is formed.

Figure 1:
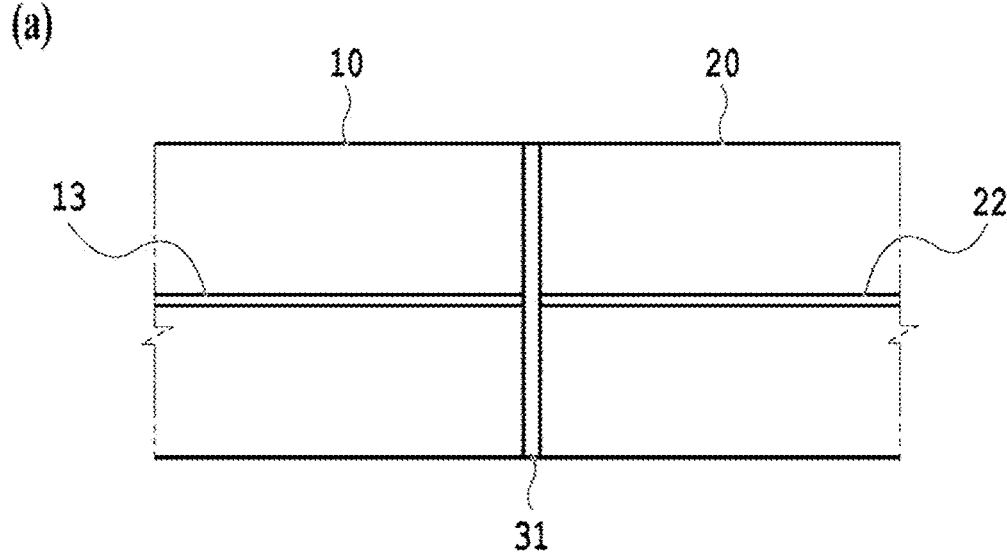
FIG. 1 is a view illustrating butt connection between a SiP chip and an InP chip in related art.
Figure 1:
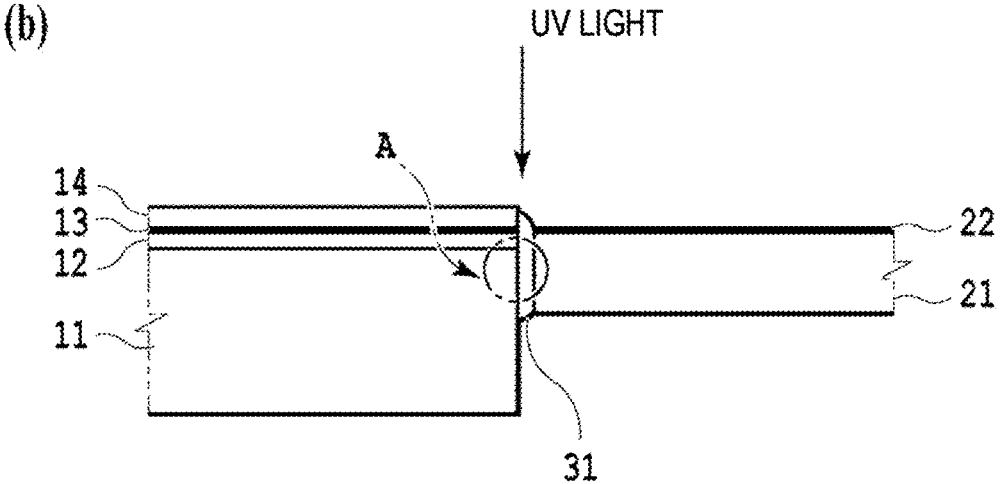
Figure 2:
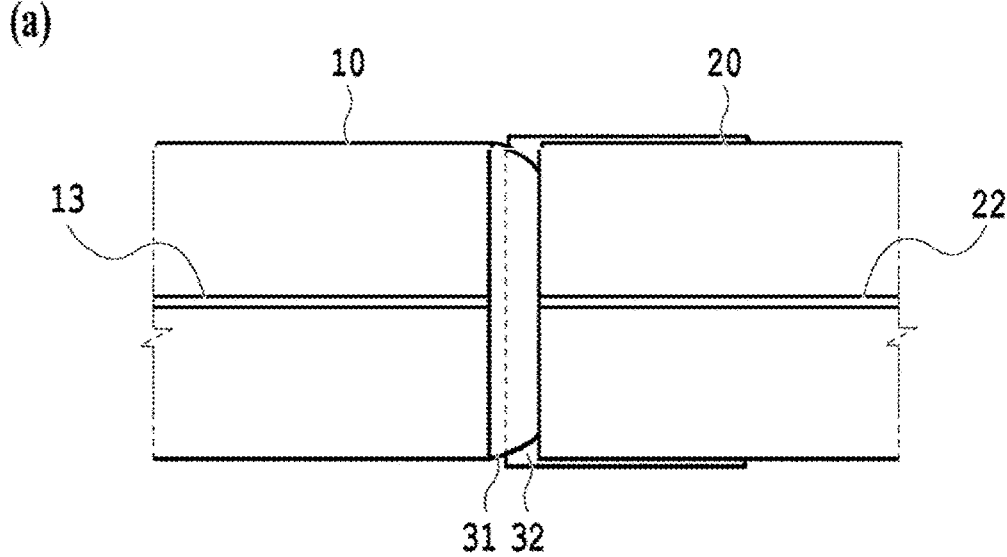
FIG. 2 is a view illustrating a connection method using a butt coupling holding substrate in related art.
Figure 2:
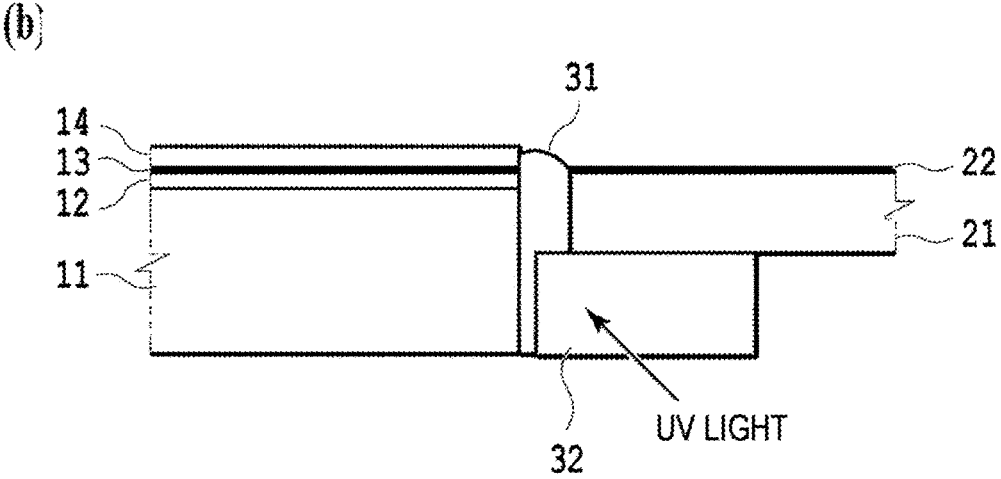
Figure 5:
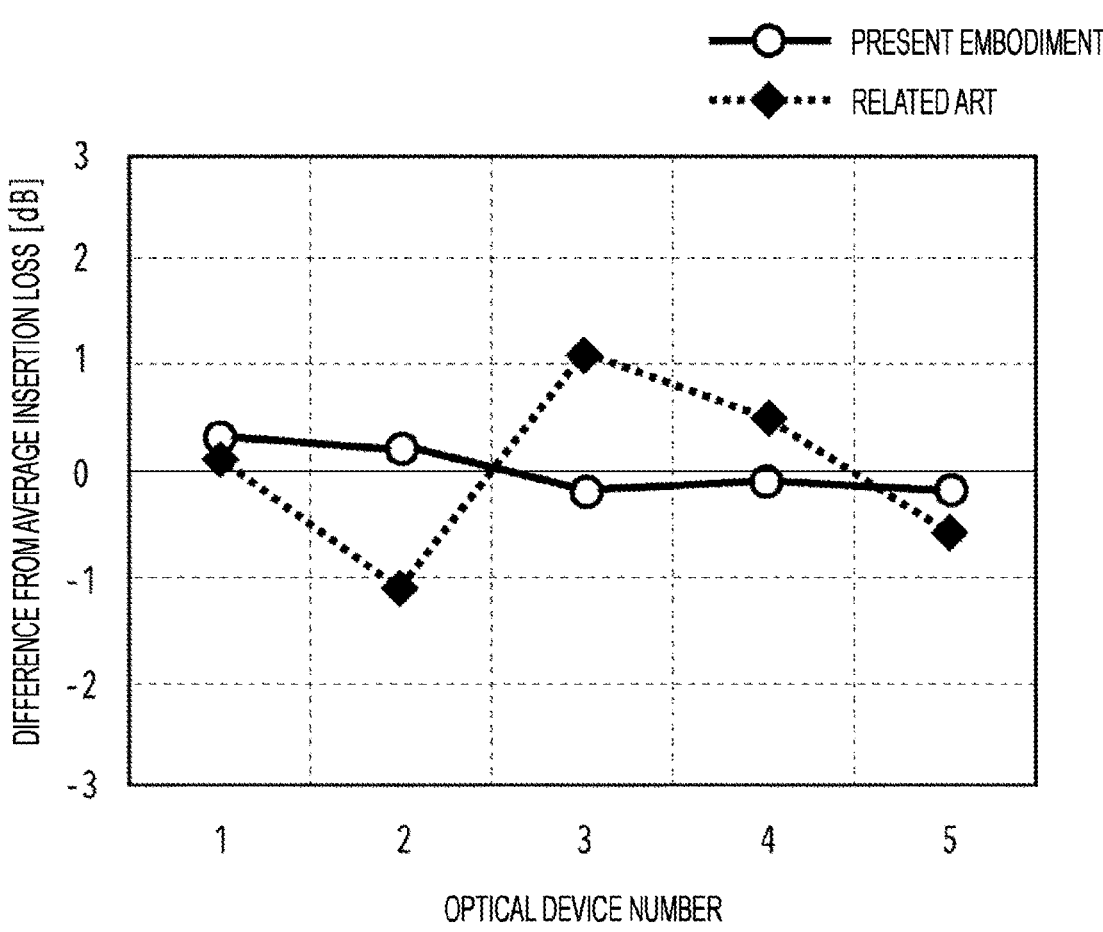
FIG. 5 is a view illustrating a result of evaluating a coupling loss of an integrated optical device according to Example 1.

FIG. 5 illustrates a result of evaluating a coupling loss of the integrated optical device according to Example 1. Five integrated optical devices of Example 1 were manufactured, signal light having a wavelength of 1.55 $\mu$m was input to the optical circuit of the SiP chip 50, and the signal light was input again to the optical circuit via the folding waveguide of the InP chip 60, and light intensity of the signal light output from the optical circuit of the SiP chip 50 was measured. For comparison, five integrated optical devices in related art illustrated in FIG. 2 were manufactured, and the same evaluation as described above was performed. FIG. 5 indicates an optical device number of each integrated optical device on a horizontal axis and indicates an insertion loss when the InP chip 60 is butt-connected to the SiP chip 50, which is a difference from each average insertion loss on a vertical axis.

As is clear from FIG. 5, in the integrated optical device of Example 1, the loss difference is within +0.4 dB, and it can be seen that the integrated optical device can be stably mounted. On the other hand, in the integrated optical device in related art, variation is as large as +1.1 dB. As described above, in the integrated optical device in related art, the connection end face is displaced by about 10 $\mu$m, a gap between the waveguides to be connected increases, and the insertion loss increases.

According to the integrated optical device of Example 1, by mounting the butt coupling holding substrate, both chips can be easily connected, and an integrated optical device that achieves stable optical coupling with small loss variation can be obtained.

The invention claimed is:

1. An integrated optical device in which an optical circuit that is provided on a substrate that does not transmit light from an ultraviolet range to a visible range and performs optical signal processing and an optical function element made of a material that does not transmit light from the ultraviolet range to the visible range are butt-connected, in the optical circuit, a butt-coupling holding substrate that transmits light from the ultraviolet range to the visible range is fixed in a groove that reaches a connection end face on which an input/output waveguide is formed, and the connection end face of the optical circuit and an end face of the butt-coupling holding substrate being processed to be flush with each other, and the optical circuit and the optical function element are fixed by a UV curing adhesive filling the connection end face that is cured by UV light transmitted through the butt-coupling holding substrate, the groove is formed from an upper cladding layer and a lower cladding layer forming the input/output waveguide, extends over a portion of the substrate, except for a region where a waveguide core of the input/output waveguide is formed, the butt-coupling holding substrate is at least in contact with the lower cladding layer and fixed so as to be housed within the groove, a depth of the groove and a thickness of the butt-coupling holding substrate are at least equal to a thickness of the optical functional element.

2. The integrated optical device according to claim 1, wherein the optical circuit includes a Si substrate, the optical function element includes a Si or InP substrate, and the butt-coupling holding substrate is made of a SiO$_2$ substrate and is thicker than the optical function element.

3. The integrated optical device according to claim 1, wherein in the butt-coupling holding substrate, a light shielding film that transmits or absorbs near-infrared light is formed on a surface facing an end face that is flush with the connection end face.

4. A method for manufacturing an integrated optical device in which an optical circuit that is provided on a substrate that does not transmit light from an ultraviolet range to a visible range and performs optical signal processing and an optical function element made of a material that does not transmit light from the ultraviolet range to the visible range are butt-connected,

9 in the optical circuit, a butt-coupling holding substrate that transmits light from the ultraviolet range to the visible range is fixed so as to be housed within a groove that reaches a connection end face on which an input/output waveguide is formed, and the connection end face of the optical circuit and an end face of the butt-coupling holding substrate are processed to be flush with each other, the groove is formed from an upper cladding layer and a lower cladding layer forming the input/output waveguide, extends over a portion of the substrate, except for a region where a waveguide core of the input/output waveguide is formed, a depth of the groove and a thickness of the butt-coupling holding substrate are at least equal to a thickness of the optical functional element, the method comprising:

a step of inputting light for alignment to the optical circuit, inputting the light again from the optical function element to the optical circuit via the input/output waveguide and monitoring the light output from the optical circuit;

a step of aligning input/output waveguides of the optical circuit and the optical function element such that light intensity of the monitored light is maximized;

a step of filling the connection end face with a UV curing adhesive; and a step of irradiating the connection end face with UV light through the butt-coupling holding substrate to cure the UV curing adhesive.

5. The method for manufacturing the integrated optical device according to claim 4, wherein the optical circuit includes a Si substrate, the optical function element includes a Si or InP substrate, and the butt-coupling holding substrate includes a SiO2 substrate and is thicker than the optical function element.

6. The method for manufacturing the integrated optical device according to claim 4, wherein in the butt-coupling holding substrate, a light shielding film that transmits or absorbs near-infrared light is formed on a surface facing an end face that is flush with the connection end face.

* * * * *